Jan. 7, 1969 R. J. CARLSON 3,419,951
FABRICATION OF METAL STRUCTURES
Filed April 25, 1966
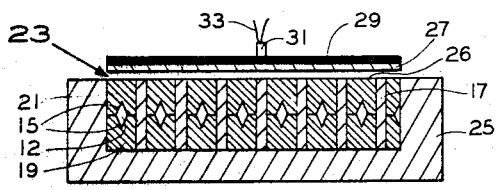
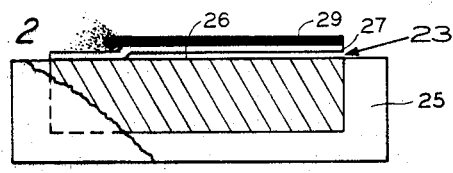
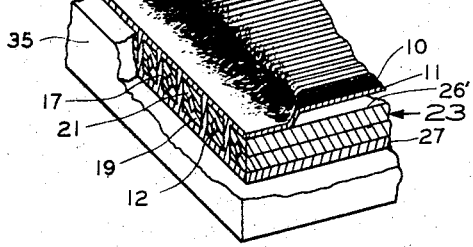
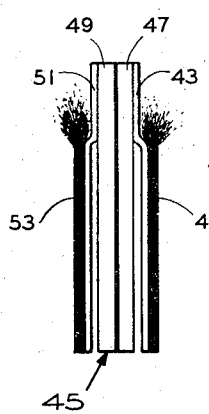
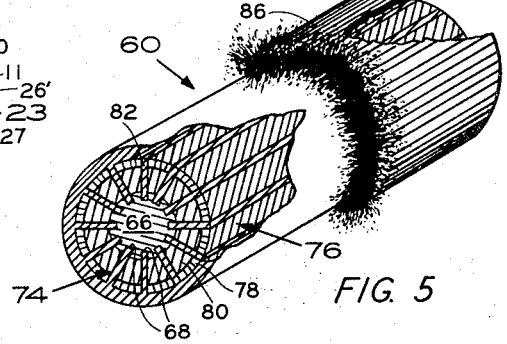
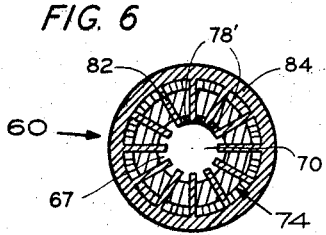
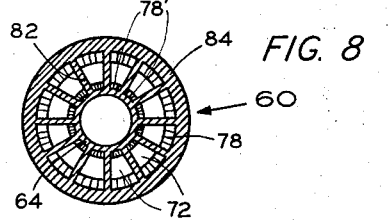
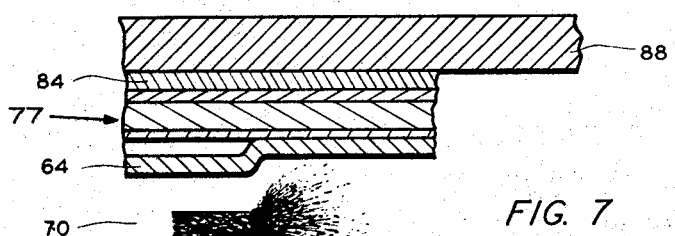
*INVENTOR.*
RONALD J. CARLSON
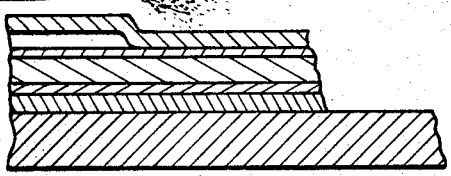
ATTORNEYS

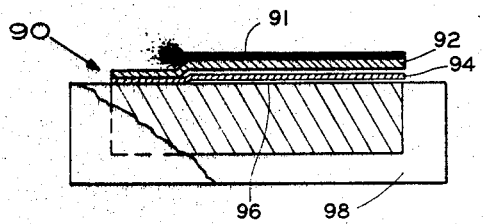
FIG. 9
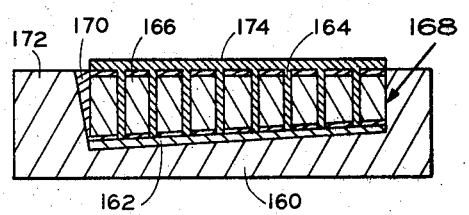
FIG. 12
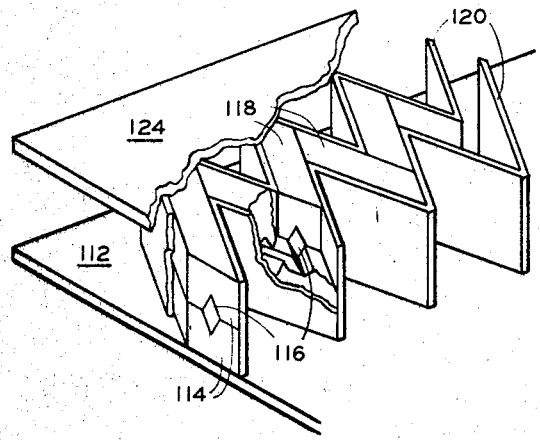
FIG. 10
FIG. 11
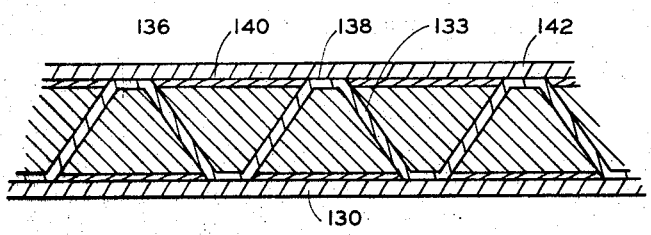
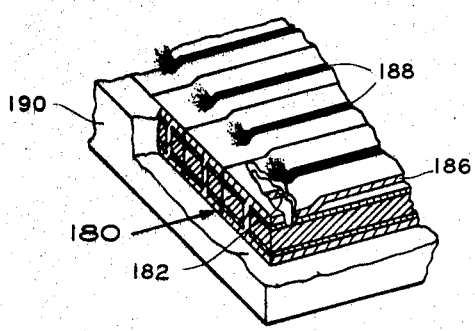
FIG. 13
INVENTOR.
RONALD J. CARLSON
ATTORNEYS United States Patent Office 3,419,951
Patented Jan. 7, 1969

3,419,951
FABRICATION OF METAL STRUCTURES
Ronald J. Carlson, Galloway, Ohio, assignor to The Battelle Development Corporation, Columbus, Ohio, a corporation of Delaware
Filed Apr. 25, 1966, Ser. No. 545,000
U.S. Cl. 29—470.1          11 Claims
Int. Cl. B23k 29/00

ABSTRACT OF THE DISCLOSURE

A method for producing hollow, ribbed metal structures involving preparing an assembly of several members, the assembly having a flat surface comprising regions of said members and maintaining intimate contact between the members. A metal sheet, greater in thickness than about one-half the thickness of the members which are to be permanently bonded to it, is positioned contiguous with the flat surface of the member assembly and spaced therefrom. A means for producing an explosive shock wave is placed on the outer surface of the metal sheet and fired to produce a shock wave which metallurgically bonds the metal sheet to the member assembly. Certain members are then selectively removed from the assembly.

---

This invention relates to a novel process for the fabrication of metal structures. The invention has specific application in the fabrication of reinforced partially hollow metal structures having properties heretofore unobtainable in such structures by means of a simple and economical process.

The use of reinforced metal structures is increasing in such areas as aircraft and missiles where high strength to weight is an important consideration. As used herein, the term "reinforced metal structures" includes sandwich structures having reinforcing ribs disposed between two face plates as well as the "stiffened skin" structures wherein reinforcement or "stiffeners" protrude from the surface of a single sheet of "skin." A variety of configurations of reinforcing ribs including honeycomb, vertical ribs, truss and the like are feasible. Further, bosses and channels may be attached to the face plates to lend further utility to the structure. Although the invention has particular utility for metallurgically bonding a sheet to a member having a smaller surface area, the present invention has particular utility in the fabrication of reinforced metal structures.

Because of present widespread interest in the use of reinforced metal structures, numerous fabrication techniques have been proposed for manufacturing them. The application of conventional bonding techniques has been emphasized in the use of adhesive bonding, brazing, or welding wherein an intermediate bonding agent unites the components of the structure. Some advantage is derived from the use of these techniques in that components are not heated excessively during fabrication. In this way, the superior structural properties of the starting material of wrought cold worked sheet are retained in the final structure. On the other hand, adhesive bonding is restricted to applications wherein the structure will not be used in a high temperature environment. Brazing requires careful assembly and cleaning of all mating surfaces and results in a product known to have a low joint efficiency. Welding is time consuming and expensive and includes the limitation of inaccessibility of joint areas also inherent in adhesive bonding and brazing. In addition, welding often leaves a metallurgically undesirable heat affected zone in the structure.

To overcome the disadvantages inherent in welding or brazing, other processes have been proposed based on the principle of uniting metal surfaces by diffusion of atoms across close-fitting metal surfaces. All of these processes depend for their effectiveness, at least to some extent, on the use of high temperatures to enhance diffusion of metal atoms. In some cases, pressure such as achieved by rolling, upsetting, or the presence of a high-pressure gas supplements the elevated temperatures. Because of the need for high temperatures during fabrication, properties of the metal components suffer the deterioration commonly associated with high temperatures including recrystallization and grain growth. Subsequent cold working to restore the original properties of the metal sheet is not feasible. Another hazard associated with high-temperature processing is oxidation of metal components. In addition to producing an undesirable surface appearance, the presence of metal oxides makes it difficult to bond metal components. Accordingly, elaborate precautions are observed to exclude the presence of oxygen during processing. This includes enclosing the components in a welded air tight container provided with means for withdrawal of oxygen. Where high pressures are exerted, completely solid filler bars must be provided in spaces that are to be hollow upon completion of fabrication. These filler bars become bonded to at least a portion of the structure being fabricated and must be removed by chemical leaching. This process is extremely time consuming and expensive especially in view of the fact that chemical attack must take place from the ends of the filler bars inwardly thus limiting the surface area of attack. The size of the pressure confining chamber or the pressure applying means further limits the size of structure that can be fabricated. In addition, where pressure is applied so as to upset the contacting metal surfaces, joint efficiencies can seldom be greater than the amount of interface extension during upsetting.

Accordingly, it is an object of the present invention to provide a process for making reinforced metal structures having properties characteristic of wrought cold worked sheet.

It is a further object of this invention to provide a process for making reinforced structures having inaccessible joint areas.

It is a still further object of this invention to provide a process for making reinforced metal structures wherein joint areas are metallurgically united without need of heating neighboring unbonded metal areas.

It is another object of this invention to provide a process for making metal reinforced structures having joint areas that are not upset during fabrication.

It is still another object of this invention to provide a process for making metal reinforced structures having joint areas free of intermediate bonding agents.

It is yet another object of this invention to provide a process for making metal reinforced structures that are easy to assemble before joining.

It is another object of this invention to provide a process for making metal reinforced structures that are simple to process subsequent to joining.

In the present invention, an assembly comprising a predetermined arrangement of at least two different members is prepared so as to present at least one flat surface made up of a mosaic pattern of portions of each of the members. A face sheet having means for producing an explosive shock wave near its outside surface is placed in opposing relation to the flat surface of the assembly of different members. A shock wave is produced so as to impinge the face sheet against the flat surface of the assembly in a manner whereby the inner surface of the face sheet becomes metallurgically united to the flat surface of the assembly of different members.

The assembly of different members comprises a structural material serving to form the structural reinforcements in the final structure and a filler material which is later removed from the assembly. Materials are easily assembled prior to fabrication. Filler material and structural material may be laid up within a simple confining frame before joining the face sheet thereto. In many embodiments, a confining frame is not needed. The filler material functions primarily to prevent sinking of the face plates into the hollow portions of the structure. Where chemical leaching is used to remove filler material, one requirement placed on the filler material is that at least a portion thereof must be different from the structural material. The filler material portion being removed must be attacked preferentially by the chemical leachant while the structural material remains passive. Where filler materials are removed mechanically, they can be of the same material as the structural material. The only other requirement for the filler material is that its acoustic impedance be fairly closely matched with that of the structural material. This avoids shock wave reflection interaction caused by edge effects during passage of the shock wave through the assembly materials. The acoustic impedance of most engineering materials are close enough to avoid problems with shock wave interaction. Because high-temperature processing is not involved, it is an important feature of this invention that the thermal expansion characteristics of the filler material and the structural material need not be matched. As a further result, filler materials having relatively low melting points may be used if they have sufficient compressive strength to withstand the shock loading. Low-melting point metals can be removed simply by melting. In addition, the filler material is not necessarily limited to metals. Two important features of this invention relate to the use of metal filler bars. First, in relatively simple configurations having straight continuous hollow portions, filler bars of at least two separate sections comprising a thin bonding portion and a heavier removable portion can be used. Only the thin bonding portion becomes bonded to the face sheets. Therefore, these are the only portions that need to be chemically leachable with respect to the rest of the structure. Where not interfering with structural integrity, the bonding portions can remain in the structure and in this event may be of the same material as the structural materials. Some advantage may lie in allowing different metal bonded portions to remain in the structure integral with the face sheets to provide, in effect, a composite face sheet. The removable portions are mechanically withdrawn and can be re-used. Second, in configurations having circuitous channels not amenable to mechanical removal of filler materials, channels may be provided in the filler material. Flow of leachant through the channels removes filler material rapidly by virtue of the large filler bar surface area presented.

Although numerous means may be provided for producing an explosive shock wave, it is preferred to employ an explosive detonated contiguous to the outside surface of the face sheets. The explosive shock wave is usually generated in a manner whereby the face sheet is progressively impinged against the assembly of different members.

In the drawings:

FIG. 1 is an end view partially in cross section of components preparatory to fabrication according to the invention.

FIG. 2 is a side view with parts broken away showing components undergoing fabrication according to the invention.

FIG. 3 is a perspective view with parts broken away showing components undergoing further fabrication according to the invention.

FIG. 4 is a side view showing an embodiment of the invention wherein flat sheets are applied simultaneously to two surfaces of an assembly.

FIG. 5 is a perspective view with parts broken away showing fabrication of the outside surface of a tubular assembly according to the invention.

FIG. 6 is a cross-sectional view showing the tubular assembly of FIG. 5 following removal of the mandrel therefrom and preparatory to further fabrication.

FIG. 7 is a cross-sectional view showing the tubular assembly of FIGS. 5 and 6 undergoing fabrication of its inside surface.

FIG. 8 is a cross-sectional view of a fabricated tubular assembly.

FIG. 9 is a side view with parts broken away showing an embodiment of the invention for fabricating structures having composite face plates.

FIG. 10 is a perspective view with parts broken away showing the filler bars and rib configuration of another panel.

FIG. 11 is a cross-sectional view showing an alternate rib configuration.

FIG. 12 is a cross-sectional view of a tapered panel undergoing fabrication according to the invention.

FIG. 13 is a perspective view with parts broken away showing structural beams undergoing fabrication.

Referring to FIG. 1, a container 25 encloses an assembly 23 comprising upper filler bars 21 and lower filler bars 19 disposed between alternate structural members 17. The structural members 17 are laid up vertically to provide a vertical rib reinforced structure. The upper filler bars 21 and the lower filler bars 19 are placed within the container with their grooved faces 15—15 in opposing relation forming channels 12. Each pair of filler bars 19–21 is separated by a structural member 17. A face sheet 27 is placed in spaced relation to the flat surface 26 of the assembly 23. Any variety of supporting means may be used to maintain the spaced relation. These include protrusions on the surface of the face sheet, or interspersed metal filings, mesh or ribbons. An explosive layer 29 is spread on the outside surface of the face sheet 27. Detonating means 31 such as a blasting cap or a detonating fuse having lead wires 33 connected to a power source (not shown) are positioned in the explosive layer 29 at one end of the face sheet 27.

In FIG. 2, detonation of the explosive layer 29 impinges the face sheet 27 progressively against the surface 26 of the assembly 23. Upon completion of firing, the bonded structure comprising the face sheet 27 and the assembly 23 now joined thereto is removed from the container 25. Removal of the filler bar 19 by lifting from the assembly and chemical leaching of the filler bar 21 would leave a stiffened skin structure. In the event that a stiffened skin structure is desired, the filler bar 19 would have a greater volume relative to the filler bar 21 which may only be several mils thick. By use of these filler bars of different size, the amount of material that must be chemically leached is reduced significantly. Where making a sandwich structure, the bonded structure comprising the face sheet 27 and assembly 23 joined thereto is inverted and placed in the container 35 of FIG. 3. A face sheet 11 is provided with an associated explosive layer 10 as described in connection with FIGS. 1 and 2. Firing of the explosive 10 progressively impinges the face plate 11 against the flat surface 26' of the assembly 23 of FIG. 3. The completed structure is readily removed from the container 35 by rapping with a blunt instrument. Where desired, the sandwich structure may now be subjected to further forming operations such as bending or the like. The filler bars 19 and 21 are selectively removed from the structure by pumping chemical leachant through the channels 12—12.

In the embodiment illustrated in FIG. 4, a sandwich structure having a pair of face sheets 43 and 51 is made according to the invention by simultaneously firing the explosive layers 41 and 53 contiguous to the outside surface of the face sheets 43 and 51. The sheets simultaneously impinge upon the surface of assembly 45 comprising the pairs of filler bars 47 and 49 interspersed transversely by structural members (not visible in FIG. 4).

To insure maintaining the structural members and filler bars in close fitting relation, a frame may be placed about the assembly 45 or a clamp can be used to grasp opposing ends of the assembly 45. As shown in FIG. 4, the assembly 45 may merely be stood on end prior to simultaneous firing of the explosive layers 41 and 53.

In the embodiment of the invention illustrated in FIGS. 5 through 8, a tubular shaped structure 60 suitable for applications such as rocket motor cases and the like is prepared according to the invention. In FIG. 5, the filler bars 76 and the structural ribs 82 forming assembly 74 are disposed about the smooth outer circumference of a mandrel 66. Where desired, the locating guides 68 in the mandrel 66 serve to insure proper placement of the respective assembly members. The filler bars 76 comprise the separate bonding filler portions 78 that abut the heavier removable filler portions 80. The bonding filler portions 78 are flush with the edges of the structural ribs so as to present a smooth outer circumference. The assembly 74 and the mandrel 66 are inserted within a coaxial cylindrical outer cover sheet 84 spaced from the smooth outer circumference of the assembly 74. An explosive layer 86 surrounding the outer cover sheet 84 is detonated progressively to impinge the outer cover sheet 85 against the surface of the assembly 74 to become metallurgically united therewith. The mandrel 66 is removed from the assembly 74 now having the outer cover sheet 84 bonded thereto. Removal of the mandrel 66 leaves the axial core 70 and the spaced portions 67 between the structural ribs 82 of FIG. 6. The bonding filler portions 78' are inserted in the spaced portions 67 to abut the removable filler portions 80 and face the axial core 60 flush with the inner edges of the structural ribs 82. The structure 60 now comprising the filler bars 77, the structural ribs 68 (not shown in FIG. 7) and the outer cover sheet 84 is placed within the die 88 of FIG. 7. A coaxial inner cover sheet 64 having its outer surface spaced from the smooth inner surface of the filler bars 77 and the structural ribs 68 (not shown in FIG. 7) is inserted within the axial core 70. An explosive 62 is detonated progressively from one end of the core 70 to impinge the inner cover sheet 64 against the filler bars 77 and the structural ribs 68 become bonded thereto. Following removal of the bonded structure 60 from the die 88, the removable filler portions 80 are slidably removed from between the bonded filler portions 78 and 78' as in FIG. 8. The bonded portions 78 and 78' may now be leached from the structure by flowing acid through the open channels 72.

For some unique combinations of tubular geometry and explosive characteristics, it may be possible to simultaneously fire explosives to simultaneously bond inner and outer cover sheets to a tubular structure. This is more difficult in the case of a tubular structure than in a flat panel as described in FIG. 4 because of the need to balance explosive energy inputs to avoid deformation of the structure.

As the bonded portions 78 and 78' may often be extremely thin (e.g., on the order of several mils), they often can remain in the structure. In this event, the bonding portions are usually of the same material as the structural ribs and cover sheets. On the other hand, the presence of the bonded portions in the structure can be used advantageously. Where channel 70 serves to carry corrosive materials, the bonding portions comprise a material different from the structural material. A bonding portion material is selected having corrosion resistance superior to that of the structural material even though it may have somewhat inferior structural properties.

Referring to FIG. 9, a reinforced structure having a face sheet 90 comprising an outer sheet 92 and an inner sheet 94 is prepared according to the invention. An assembly 96 comprising structural members and filler bars is laid up within a container 98 as described, for example, in connection with FIGS. 1, 2, and 3. The inner sheet 94 having the requisite corrosion resistant properties is spaced from the outer surface of the assembly 96. An outer sheet 92 having an explosive layer 91 on its outside surface and having superior structural properties to those of the inner corrosion resistant sheet 94 is spaced from the inner sheet 94. The explosive 91 is detonated to impinge the outer sheet 92 on the inner sheet 94 and the inner sheet 94 upon the surface of the assembly 96. The result of the impingement is to metallurgically unite the inner and outer sheets 92 and 94 and the inner sheet 94 with the assembly 96. The method of FIG. 9 is used preferably where a composite facing is desired and the composite filler bars described in connection with FIGS. 5 through 8 cannot be used.

An example of a structure requiring the type of filler bars illustrated in FIGS. 1 through 3 is illustrated in FIG. 10. The reinforcement 120 of FIG. 10 comprises a corrugated configuration laid on end between the face sheets 112 and 124. While the end filler bars 114 are amenable to mechanical removal, the inner filler bars 118 must be removed by chemical leaching. The channels 116—116 provided within the area of the filler bars 114 and 118 carry the leachant through the entire structure and provide means for recirculation of acid and rapid removal of the filler bars 114 and 118.

Many configurations of structures can be made according to the present invention. The configuration of the reinforcement is limited only by the requirement that any bonding desired must be at a face sheet interface and the hollow portions must be interconnected to secure the removal of filler bars. In FIG. 12, a continuous strip is bent to form the ribs 133 and the flat portions 138. The flat portions 138 abut the surface of face sheets 130 and 142 to provide a large surface area for bonding thereto. The spaces formed between the ribs 133 are filled with filler bars comprising a removable filler portion 136 and a bonding filler portion 140. Other configurations of reinforcement similar to that of FIG. 12 can be used. For example, a corrugated reinforcement would be bonded to the face sheets at its arcuate faces.

In FIG. 13, an assembly of the structural ribs 164 and separable composite filler bars 166 of progressively decreasing height having a face plate 174 bonded thereto according to the invention is confined in a container 160. To produce a tapered sandwich panel, the assembly of bonded elements and the shims 162 and 170 are removed from the container 160. The bonded elements are inverted and set in the container 160 with the surface of the assembly 168 flush with the container surface 172 and the surface of the shim 170, now inserted at the opposing edge of the container. A second face sheet is then applied to the surface of assembly 168. By using various shims or separate bonding containers, a wide variety of tapered or double tapered panels can be made.

In addition to reinforcing ribs, the internal structure of a panel may be provided with bosses as well as internal conduits for passage of cables or fluids. These are merely set in the assembly of filler bars and structural members with a free surface at the top of the assembly of components available for bonding to the face sheet.

To reduce the possibility of surface damage to the face sheets that may occur with chemical explosives, a buffer material may be interposed between the explosive and the face sheet. The buffer may comprise polystyrene plastic foam, black rubber or the like.

EXAMPLE 1

It was desired to produce a vertical rib reinforced sandwich structure of aluminum alloy (6061 T–6) having the followings dimensions:

| | Inches |
|---|---|
| Width | 6¾ |
| Length | 8 |
| Height | 1⅛ |
| Rib height | 1 |
| Rib width | 1/16 |
| Face sheet thickness | 1/16 |
| Distance between ribs | ½ |

A rectangular frame of carbon steel was prepared from bars 1-inch long by 1¼-inches high. The frame having inside dimensions of approximately 6.75 x 8 inches was welded to a supporting base having a thickness of 1½ inches to form a container 25 as shown in FIG. 1. A 6¾ x 8 x ⅛-inch shim was placed on the supporting bases with the frame. Prior to assembly, all aluminum parts were cleaned with alkaline cleaner, water and alcohol and steel parts were pickled in hydrochloric acid. Twelve steel filler bars having dimensions of ½-inch x 1-inch x 8-inches were placed alternately lengthwise with 11 aluminum ribs. An aluminum face sheet of 1/16-inch thickness was placed over the assembly of ribs and filler bars and rested on the frame. This provided a clearance of 1/16-inch between the underside of the face sheet and the surface of the assembly of ribs and filler bars. The face sheet was then covered with black rubber having a thickness of ⅛-inch. A rectangular cardboard box having a triangular shaped section affixed to one end was filled with explosive sufficient to provide 6 grams of explosive per square inch of face sheet area. A detonating fuse communicated with the explosive at the apex of the triangular shaped section. When placed on the outside surface of the face sheet, the box extended outward from both ends of the frame with the triangular section somewhat removed therefrom. Placement of the box was such that detonation could proceed progressively in a direction parallel to the ribs. The explosive comprised grade 70C of Nitrostarch dynamite (Trojan Powder Company) characterized by a detonation velocity of 11,500 ft./sec. and a peak pressure of 750,000 p.s.i.

Following firing of the explosive, and removal of materials from the frame, the face plate was firmly bonded to the surface of the assembly of filler bars and ribs. The shim was removed from the supporting base and the bonded materials enclosed in the frame with the bonded face plate resting on the supporting base. A face plate of 1/16-inch aluminum was placed over the surface of the assembly enclosed within the frame and bonded thereto in the manner described for the initial face plate. Upon removal from the frame, the entire structure was placed in warm (approximately 160° F.) nitric acid (50 percent $HNO_3$) until the steel filler bars were dissolved from the structure.

The face plates were found to be metallurgically united with the ribs at all the face plate-rib interfaces.

EXAMPLE 2

It was desired to produce a vertical rib reinforced sandwich structure of titanium alloy having the following dimensions:

| | Inches |
|---|---|
| Width | 7.67 |
| Length | 7.00 |
| Height | 1.408 |
| Rib height | 1.25 |
| Rib width | 0.079 |
| Face sheet thickness | 0.079 |
| Distance between ribs | 0.625 |

A rectangular frame having inside dimensions of 7 inches x 7¾ inches and supporting base were prepared from carbon steel to form a container 25 as shown in FIG. 1. A shim having a thickness of about 3/16-inch was placed on the supporting base. Titanium components were cleaned in hydrofluoric acid, water and alcohol. Eleven pairs of steel filler bars were placed within the frame alternately lengthwise with ten titanium ribs. Each pair of filler bars comprised two rectangular bars having dimensions of ⅝-inch x ⅝-inch x 6 inches. A triangular shaped groove having a width of ⅛-inch and an apex 3/16-inch deep ran through one of the lengthwise faces of each bar. With the grooved faces in end to end relation within the frame, a channel was formed having a ⅛-inch diagonal. Titanium face sheets were bonded to the assembly of filler bars and ribs in the manner described for Example 1. The explosive loading of dynamite was 6½ grams/in.² and an initial clearance of the face sheet to the members being bonded was 3/32-inch.

Steel filler bars were dissolved by flowing warm (approximately 160° F.) nitric acid (50 percent $HNO_3$) through the channels in the filler bars.

The resultant sandwich structure was rigid and characterized by a continuous bond at the face sheet-rib interfaces.

While a layer of explosive spread uniformly across the surface of a face plate has been shown for purposes of illustration, strips of explosive may be used covering only the areas of the outside of the face sheets corresponding to locations on the underside that must be bonded. In FIG. 14, a plurality of the I-beams 180 are fabricated in the container 190 according to the invention by using explosives that are simultaneously detonated to impinge the facing portions 186 against the vertical rib 184 at the surface 182. Explosive strips 188 may also be used in the fabrication of panels and find particular utility where a large amount of surface area is being bonded. Following fabrication of panels or structural members using explosive strips and flat facing sheets, the facing sheets are somewhat wavy. Where the surface waviness is objectionable, the materials may be rolled lightly to flatten the structure prior to removal of filler bars. Instead of a flat face sheet, the sheet may be dimpled to provide alternate depressed portions at the filler bar surfaces and raised portions at the rib surfaces. In addition to I-beams, other structural members such as C-beams or L-beams can be made. A uniform layer of explosive as well as the explosive strips 188 of FIG. 14 can be used for bonding of these structural beams.

It will be apparent that new and useful methods for preparing metal structures have been described. Although several preferred embodiments of the invention have been described, it is apparent that various further modifications may be made. For example, progressive detonation of an explosive layer to impinge one surface of a material against a surface of still another material has been shown. Other techniques such as generating shock waves in water by explosion, spark gaps or exploding films may be used. It will be understood that such modifications in details, materials, steps and arrangements of parts, which have been herein described and illustrated may be made within the principles and scope of the invention.

What is claimed is:
1. A method for producing hollow, ribbed metal structures comprising:
 (a) preparing an assembly comprising a plurality of members, said assembly forming a flat surface comprising a plurality of regions of said members;
 (b) maintaining intimate contact between the contiguous surfaces of said plurality of members;
 (c) providing a metal sheet having its inner surface contiguous to said flat surface and spaced therefrom, the thickness of said metal sheet being greater than about one-half the thickness of any of said plurality of members which are to be permanently bonded to said metal sheet;
 (d) providing near the outside surface of said metal sheet means for producing an explosive shock wave;
 (e) firing said means for producing an explosive shock wave whereby said shock wave impinges said inner surface of said metal sheet against said flat surface to metallurgically unite said inner surface of said metal sheet to said flat surface; and (f) selectively removing at least one of said plurality of members from said assembly.

2. The method of claim 1 wherein said means for producing an explosive shock wave comprises a layer of explosive material communicative with the outside surface of said metal sheet.

3. The method of claim 2 wherein said layer of explosive material is detonated progressively from one end of said outside surface of said metal sheet to the opposing end of said metal sheet.

4. The method of claim 1 wherein a portion of said assembly comprising a plurality of members comprises at least one structural member.

5. The method of claim 4 wherein means for producing an explosive shock wave comprising an explosive layer is fired progressively in a direction substantially parallel to said at least one structural member.

6. The method of claim 4 wherein another portion of said assembly comprising a plurality of members comprises at least one filler material.

7. The method of claim 6 wherein said at least one filler material is provided with a channel running therethrough.

8. The method of claim 6 wherein said at least one filler material comprises at least two separable sections comprising a thin bonding portion and a heavier removable portion, one surface of said bonding portion being flush with an edge of said at least one structural member and the opposite surface of said bonding portion abutting said heavier removable portion.

9. A method for producing hollow, ribbed metal structures comprising:

(a) preparing an assembly comprising a plurality of members, said assembly forming two flat surfaces comprising a plurality of regions of said members;

(b) maintaining intimate contact between the contiguous surfaces of said plurality of members;

(c) providing two metal sheets, each of said two sheets having an inner surface contiguous to one of said two flat surfaces and spaced therefrom, the thickness of said metal sheets being greater than about one-half the thickness of any of said plurality of members which are to be permanently bonded to said metal sheets;

(d) providing near the outside surface of each of said two metal sheets means for producing an explosive shock wave;

(e) simultaneously firing said means whereby said shock wave simultaneously impinges each of said inner surfaces of said two metal sheets against each of said two flat surfaces to metallurgically unite each of said inner surfaces of said two metal sheets to each of said two flat surfaces; and (f) selectively removing at least one of said plurality of members from said assembly.

10. A method for producing hollow, ribbed metal structures comprising:

(a) preparing an assembly comprising a plurality of members, said assembly forming a smooth surface of revolution about a central axis;

(b) maintaining intimate contact between the contiguous surfaces of said plurality of members;

(c) providing a metal sheet coaxial with said smooth surface of revolution of said assembly, a first face of said metal sheet being contiguous to said smooth surface of revolution of said assembly and spaced therefrom, the thickness of said metal sheet being greater than about one-half the thickness of any of said plurality of members which are to be permanently bonded to said metal sheet;

(d) providing near the second face of said metal sheet means for producing an explosive shock wave;

(e) firing said means for producing an explosive shock wave whereby said shock wave impinges said first surface of said metal sheet against said smooth surface of revolution of said assembly to metallurgically unite said first surface of said metal sheet to said smooth surface of revolution of said assembly; and (f) selectively removing at least one of said plurality of members from said assembly.

11. A method of making tubular reinforced structures comprising:

(a) disposing an assembly comprising a plurality of members about the outer circumference of a mandrel, said assembly having a smooth outer surface comprising a plurality of regions of said members;

(b) surrounding said smooth outer surface of said assembly with a coaxial outer cover sheet having its inner surface contiguous to said smooth outer surface of said assembly and spaced therefrom, the thickness of said cover sheet being greater than about one-half the thickness of any of said plurality of members which are to be permanently bonded to said metal sheet;

(c) providing near the outer surface of said outer cover sheet means for producing an explosive shock wave;

(d) firing said means for producing an explosive shock wave whereby said shock wave impinges said inner surface of said outer cover sheet against said smooth outer surface of said assembly to metallurgically unite said inner surface of said outer cover sheet to said smooth outer surface of said assembly;

(e) removing said mandrel to form an axial core;

(f) inserting within said core a coaxial inner core sheet having its outer surface contiguous to a smooth inner surface of said assembly and spaced therefrom, the thickness of said core sheet being greater than about one-half the thickness of any of said plurality of members which are to be permanently bonded to said metal sheet;

(g) providing within said inner cover sheet means for producing an explosive shock wave;

(h) firing said means for producing an explosive shock wave whereby said shock wave impinges said outer surface of said inner cover sheet against said smooth inner surface of said assembly to metallurgically unite said outer surface of said inner cover sheet to said smooth inner surface of said assembly; and (i) selectively removing at least one of said plurality of members from said assembly.

References Cited

UNITED STATES PATENTS

| | | | |
|---|---|---|---|
| 3,031,746 | 5/1962 | Ciarleglio et al. | |
| 3,044,160 | 7/1962 | Jaffee | 29—423 |
| 3,060,879 | 10/1962 | Staba. | |
| 3,121,283 | 2/1964 | Kaempen | 29—497.5 XR |
| 3,222,144 | 12/1965 | Davenport | 29—470.1 XR |

JOHN F. CAMPBELL, *Primary Examiner.*

PAUL M. COHEN, *Assistant Examiner.*

U.S. Cl. X.R.

29—421, 423, 455, 481, 486, 497.5

Dedication 3,419,951.—*Ronald J. Carlson*, Galloway, Ohio. FABRICATION OF METAL STRUCTURES. Patent dated Jan. 7, 1969. Dedication filed May 7, 1973, by the assignee, *The Battelle Development Corporation*.

Hereby dedicates to the People of the United States the entire remaining term of said patent.

[*Official Gazette October 30, 1973.*]